United States Patent [19]

Brienza

[11] Patent Number: 4,983,372

[45] Date of Patent: Jan. 8, 1991

[54] PROCESS FOR PREPARING HALIDE-FREE RHODIUM NITRATE

[76] Inventor: Walter C. Brienza, 494 Ivy La., Wyckoff, N.J. 07481

[21] Appl. No.: 555,233

[22] Filed: Jul. 20, 1990

[51] Int. Cl.$^5$ ............................................. C01G 55/00
[52] U.S. Cl. ................................... 423/395; 423/472; 423/491
[58] Field of Search ..................... 423/395, 472, 491

[56] References Cited

U.S. PATENT DOCUMENTS 4,844,879 7/1989 Yamazaki .......................... 423/395
4,859,445 8/1989 Hirose ................................ 423/491

FOREIGN PATENT DOCUMENTS 2233677 1/1974 Fed. Rep. of Germany ...... 423/395
2209 1/1983 Japan .................................. 423/395
7508653 1/1976 Netherlands ....................... 423/395

OTHER PUBLICATIONS

Chemical Abstracts 111 (4) 25831v (1990).

Primary Examiner—Wayne A. Langel

[57] ABSTRACT

Halide-free rhodium nitrate is produced by a process which comprises quantitative reaction of metallic rhodium with hydrochloric acid, gaseous chloride and gaseous hydrogen chloride to produce hexachlororhodic acid, followed by the quantitative reaction of this acid with potassium iodide to produce rhodium iodide. The resulting rhodium iodide is quantitatively converted to halide-free rhodium nitrate by reacting with nitric acid and hydrogen peroxide.

10 Claims, No Drawings

PROCESS FOR PREPARING HALIDE-FREE RHODIUM NITRATE

FIELD OF THE INVENTION

This invention relates to a process for manufacturing rhodium nitrate and is particularly related to a process for manufacturing rhodium nitrate which is essentially free from halides, notably chloride. More specifically this invention is concerned with a process for manufacturing chloride-free rhodium nitrate for use as a stable and effective catalyst.

BACKGROUND OF THE INVENTION

Rhodium nitrate is basically employed in two major catalytic processes. Approximately 72% of the present production of rhodium as rhodium nitrate is used as an impregnation agent for the manufacture of heterogeneous 3-way automotive exhaust catalyst. This catalyst is cordierite monolith coated with an aluminum oxide ($Al_2O_3$) washcoat wherein the washcoat contains platinum, rhodium and palladium in reduced state. See U.S. Pat. No. 3,565,830.

Approximately 10–15% of the rhodium as rhodium nitrate ends up as a precursor in the manufacture of a homogeneous catalyst used in the well-known oxo alcohol process. See Organic Synthesis with Noble Metal Catalysts, P. N. Rylander, pages 60–76 (1973). This catalyst catalyzes the hydroformulation reaction in the oxo alcohol synthesis and is known as hydriodomethyltrisphenylphosphene rhodium-1. See Chemistry of Rarer Platinum Metals, W. P. Griffin, pages 370–388 (1967).

Also, some rhodium nitrate is used as a catalyst for the telomerization of butadiene with allyl alcohol, the polymerization of isoprene in allyl alcohol solution and the polymerization of butadiene. See Gmellin Handbook of Inorganic Chemistry, Rhodium, Supplemental Volume B1 (8th edition 1982), pages 65–66.

In order for rhodium nitrate to be stable and effective, it is essential that it be free of halide. Otherwise, even minor amount of the halide adversely effects its catalytic activity and performance. See U.S. Pat. No. 4,844,879. As described in said patent, rhodium nitrate is conventionally prepared by adding a caustic soda aqueous solution or aqueous ammonia to a rhodium chloride solution to first form rhodium hydroxide precipitate. The resulting rhodium hydroxide precipitate is then dissolved in nitric acid to produce rhodium nitrate. However, as is stated in said patent, the conversion of the rhodium chloride to rhodium hydroxide is insufficient, i.e., it is not quantitative, and hence the rhodium hydroxide will contain impurities (chloride) which ends up in the rhodium nitrate, and thus lowers its catalytic activity or efficiency. Accordingly, said patent describes a process for preparing a rhodium nitrate solution which comprises dissolving rhodium black in sulfuric acid, heating the reaction mixture, adjusting the pH of the resulting solution to neutral or alkaline (7 to 9) by the addition of an alkaline solution, thereby precipitating the rhodium as rhodium hydroxide. The precipitated rhodium hydroxide is then separated and dissolved in nitric acid to form rhodium nitrate. However, the conversion of rhodium to rhodium hydroxide is not quantitative and hence some of the rhodium is lost in the reaction.

Another method of manufacturing rhodium nitrate is described in the Russian Journal of Inorganic Chemistry, Volume 8, Number 13 (1973), page 1737. According to the method described in said Journal, when rhodium iodide ($RhI_3$) is treated with boiling nitric acid, the black iodide dissolves in the acid forming rhodium nitrate, with the liberation of violet iodine vapor and brown nitrogen oxide. The rhodium nitrate produced, after drying to constant mass at 105°–110° C., is a brown solid product which does not contain iodide. However, when aqueous rhodium nitrate is heated to remove the nitric acid, the rhodium nitrate decomposes to produce rhodium oxide which has no catalytic value.

Accordingly, it is an object of this invention to provide a process for the manufacture of rhodium nitrate which is essentially free from halides, notably chloride.

It is a further object of this invention to provide such halide-free rhodium nitrate by a process which is quantitative wherein the reactants are completely converted to the desired products.

It is also an object of this invention to provide a halide-free rhodium nitrate which is particularly useful as a catalyst with excellent stability and catalytic efficiency.

The foregoing and other objects and features of this invention will become more apparent from the ensuing detailed description thereof.

SUMMARY OF THE INVENTION

In accordance with the process of this invention hexachlororhodic acid is first produced by the reaction of powdered or spongy metallic rhodium with hydrochloric acid, gaseous chlorine and gaseous hydrogen chloride. The resulting hexachlororhodic acid is then reacted with potassium iodide to form rhodium iodide. The rhodium iodide thus formed is reacted with nitric acid and hydrogen peroxide to form the halide-free a rhodium nitrate.

The conversions of rhodium to hexachlororhodic acid and of rhodium iodide to rhodium nitrate by the process of this invention is totally quantitative, therefore, the resulting rhodium nitrate is completely free from any chloride or iodide.

DETAILED DESCRIPTION OF THE INVENTION

In order to produce a halide-free rhodium nitrate, it has been found that the reactions involved in the process of this invention must be completely quantitative. The process of this invention contemplates the manufacture of halide-free rhodium nitrate by the following series of sequential reaction steps:

$$2Rh + 6HCl + 3Cl_2 \rightarrow 2H_3RhCl_6 \tag{I}$$

$$H_3RhCl_6 + 3KI \rightarrow RhI_3 + 3HCl + 3KCl \tag{II}$$

$$2RhI_3 + 8HNO_3 \rightarrow 3I_2 + 2NO + 4H_2O + 2Rh(NO_3)_3 \tag{III}$$

It is essential to the quantitative conversion of rhodium to halide free rhodium nitrate that in reaction (I) gaseous hydrogen chloride be employed as a reactant and that in reaction (III) hydrogen peroxide be employed together with nitric acid. As explained hereinafter, unless gaseous hydrogen chloride is employed in reaction (I) and hydrogen peroxide is used in reaction (III), the resulting rhodium nitrate will be contaminated with halides (chloride and iodide). The presence of halides in rhodium nitrate adversely effects its catalytic performance and activity.

The details of the reactions and reaction conditions will now be described with reference to a preferred embodiment of the invention.

A. Reaction (I)—Preparation of Hexachlororhodic Acid

In this step of the process, 16 kilograms of rhodium, in powdered or spongy metallic form, is charged into a 190-liter glass-lined steam jacketed Pfaudler reactor. 102 liters of a concentrated (36%) hydrochloric acid is also introduced into this reactor and the reactants agitated, refluxed at 95° C. while passing a mixture of gaseous chlorine and gaseous hydrogen chloride, each at a flow rate of 100 cm$^3$/minute through the reactor. The reaction is exothermic and the reaction temperature rises to 110° C. in 30 minutes. In approximately 72 hours, the rhodium is quantitatively converted to hexachlororhodic acid. Upon complete dissolution of rhodium and its conversion to hexachlororhodic acid, the resulting hexachlororhodic acid is cooled to 20° C. and filtered into glass-lined Pfaudler reactor. While agitating, the hexachlororhodic acid is refluxed at 100° C. for 2 hours to remove any chlorine gas present in the mixture. The hexachlororhodic acid is then cooled to 85° C. for use in the second reaction step.

It is critical in reaction (I) that gaseous hydrogen chloride be employed as one of the reactants in order to insure complete quantitative conversion of rhodium to hexachlororhodic acid. Otherwise, the reaction conditions are not per se critical. If gaseous hydrogen chloride is not employed as a reactant in this step, not all the rhodium metal will be converted t hexachlororhodic acid.

B. Reaction (II)—Conversion of Hexachlororhodic Acid to Rhodium Iodide

The hexachlororhodic acid produced in the prior step is reacted with potassium iodide to produce rhodium iodide. In accordance with this step of the process, 75.75 kg of technical grade potassium iodide is dissolved in 63.2 liters of deionized water in a separate polypropylene container. The resulting potassium iodide solution is pumped into the reactor containing the hexachlororhodic acid and the mixture is maintained at 85° C. with agitation. The resulting mixture is then reflux, heated to 90°-95° C., with agitation and thereafter cooled to 20° C. under continued agitation. Using a double diaphragm air pump, the reaction product is pumped onto a 61 cm. Sperry filter press and filtered through 1 micron Tyvek (available from E.I. DuPont de Nemours & Co.) packed by latex glazed polypropylene cloth. When the filtrate is clear, the filtrate is pumped to a large holding tank.

After the filtration is completed, the filter cake (RhI$_3$) is washed with sufficient deionized water to produce a chloride-free rhodium iodide. The filter cake is then dried with compressed air overnight and then it is removed for use in the subsequent process steps.

C. Reaction (III)—Manufacture of Halide-Free Rhodium Nitrate by the Reaction of Rhodium Iodide, Nitric Acid and Hydrogen Peroxide As it was previously mentioned, it is essential in the process of this invention that rhodium iodide is reacted with nitric acid and hydrogen peroxide in order to produce a halide-free rhodium nitrate. Thus, 227 liters of 70% nitric acid (although this concentration may vary from about 65 to 70%) is introduced into a 757 liter glass-lined Pfaudler reactor and heated to 95° C. While agitating the reactor content, the rhodium iodide crystal produced in Reaction (II) is introduced into the reactor over a two-hour period. After all the rhodium iodide is added, 10 liters of 35% hydrogen peroxide solution (although this concentration may vary from about 35 to 95%) is introduced into the reactor at 95° C. over a one-hour period. The resulting rhodium nitrate is concentrated by evaporation to an 8–12% wt. rhodium nitrate solution and the final product is then clarified by filtration.

EXAMPLE 1

This example illustrates the results of carrying out reaction (I) in the presence of gaseous hydrogen chloride.

250 grams of metallic rhodium sponge was introduced into a four liter QVF jacketed reactor (available from Dow Corning Glass Works, Big Flat, New York), equipped an agitator, condensa and reflux splitter assemblies. 1.65 liters of 36% concentrated hydrochloric acid was thereafter added to the reactor and the reactants were agitated, refluxed at 95° C. and a mixture of gaseous chlorine and hydrogen chloride was passed through the mixture at a flow rate of approximately 100 cm$^3$/minute. The temperature of the reaction mixture was observed to rise to 110° C. after 72 hours of residence time. The reaction product, i.e., hexachlororhodic acid was filtered through 0.23 micron Millipore membrane filter. After washing the membrane with deionized water to remove any remaining hexachlororhodic acid, no particulate matter was observed, indicating quantitative dissolution and conversion of the rhodium metal.

COMPARATIVE EXAMPLE 1

The procedure of Example 1 was repeated except that no gaseous hydrogen chloride was used. Thus, as in Example 1, 250 grams of metallic rhodium sponge was introduced into a four liter QVF jacketed reactor equipped with an agitator, condenser and reflux splitter assemblies. Thereafter, 1.64 liters of 36% concentrated hydrochloric acid was added to the reactor, the reactants were agitated and refluxed at 95° C. while gaseous chlorine alone was introduced into the reactor at the rate of 100 cm$^3$/minute. An exotherm was observed with the reaction temperature rising to 11° C. after 72 hours. The resulting hexachlororhodic acid was filtered through a 0.23 micron Millipore membrane filter and the membrane was washed with deionized water to remove any remaining hexachlororhodic acid. However, unlike in Example 1, particulate matter was observed in this comparative example. The particulate matter and the filter were dried at 110° C. overnight to constant weight. The particulate matter was removed from the filter and determined to weigh 27.450 grams. Analysis of this material by optical emission spectroscopy indicated that this residue material was rhodium metal. This indicates that the conversion and dissolution of rhodium was not quantitative and that only 89.02% of the rhodium had been converted to hexachlororhodic acid.

EXAMPLE 2

This example illustrates that the use of hydrogen peroxide in reaction (III) results in the production of rhodium nitrate which is free from halides.

1.175 kilograms of anhydrous rhodium iodide was introduced into a four liter QVF jacketed reactor as in the previous examples. Thereafter, 3.65 liters of 70% nitric acid was added to the reactor and the reactants were agitated under reflux at 95° C. until no further nitrogen oxides were produced (approximately two hours). 0.161 liter of a 35% aqueous solution of hydrogen peroxide was then charged to the reactor and refluxing continued for another hour. The resulting rhodium nitrate was concentrated to a 10 wt. % solution and filtered. A sample of the rhodium nitrate filtrate was checked for halide contamination by gravimetric precipitation with silver nitrate. No precipate was formed indicating absence of halides. This was also conformed by spark source mass spectroscopy which indicated chloride and iodide contamination of less than 0.5 part per million.

COMPARATIVE EXAMPLE 2

The procedure of Example 1 was repeated except that hydrogen peroxide was not used. All other conditions were the same as in Example 1.

A sample of the aqueous rhodium nitrate produced in this comparative example was analyzed for halide contamination by gravimetric precipitation with silver nitrate. The results indicated that iodide contamination was 4500 parts per million based on metallic rhodium. Spark source mass spectroscopy confirmed the presence of iodide contamination and further indicated that iodide was a major contaminant above the upper limits of detection.

While the process of this invention was hereinbefore described with certain degrees of particularity, it must be understood that the reaction conditions and the process steps may be varied somewhat without departing from the scope of the invention. Thus, in general, reaction (I) can be carried out at a temperature of from about 95° to about 110° C. for a period of from about 72 to about 96 hours. Similarly, reaction (III) may be effected at a temperature of from about 95° to about 110° C. for a period of time sufficient to attain quantitative conversion of rhodium iodide to rhodium nitrate.

Where rhodium iodide is available, the halide-free rhodium nitrate may be prepared by reacting rhodium iodide with nitric acid and hydrogen peroxide under the same conditions hereinbefore described. It is apparent, therefore, that where rhodium nitrate is available, reactions (I) and (II) are not needed in this embodiment of the invention.

What is claimed is:

1. A process for preparing halide-free rhodium nitrate which comprises:
   (a) reacting rhodium metal with concentrated hydrochloric acid, gaseous chlorine and gaseous hydrogen chloride under conditions which result in quantitative conversion of the rhodium metal to hexachlororhodic acid.
   (b) reacting the resulting hexachlororhodic acid with potassium iodide to form rhodium iodide, and
   (c) reacting said rhodium iodide with nitric acid and hydrogen peroxide to produce halide-free rhodium nitrate.

2. A process as in claim 1 wherein the reaction in step (a) is conducted at a temperature of from about 95° to about 110° C. for a period of from about 72 to about 96 hours.

3. A process as in claim 2 wherein the reaction in step (c) is conducted at a temperature of from about 95° to about 110° C.

4. A process as in claim 1 wherein said nitric acid in step (c) is in the form of a concentrated aqueous solution containing from about 65 to about 70 percent by weight nitric acid.

5. A process as in claim 2 wherein said nitric acid in step (c) is in the form of a concentrated aqueous solution containing from about 65 to about 70 percent by weight nitric acid.

6. A process as in claim 3 wherein said nitric acid in step (c) is in the form of a concentrated aqueous solution containing from about 65 to about 70 percent by weight nitric acid.

7. A process for preparing halide-free rhodium nitrate which comprises reacting rhodium iodide with nitric acid and hydrogen peroxide under conditions whereby said rhodium iodide is quantitatively converted to rhodium nitrate which is essentially free of halides.

8. A process as in claim 7 wherein said nitric acid is in the form of concentrated aqueous solution containing from about 65 to about 70 percent nitric acid.

9. A process as in claim 7 wherein the reaction is conducted at a temperature of from about 95° to about 110° C.

10. A process as in claim 8 wherein the reaction is conducted at a temperature of from about 95° to about 110° C.

* * * * *